C. A. & C. E. BRINLEY.
PULLEY.
APPLICATION FILED JAN. 5, 1912.
1,152,282.
Patented Aug. 31, 1915.
2 SHEETS—SHEET 1.
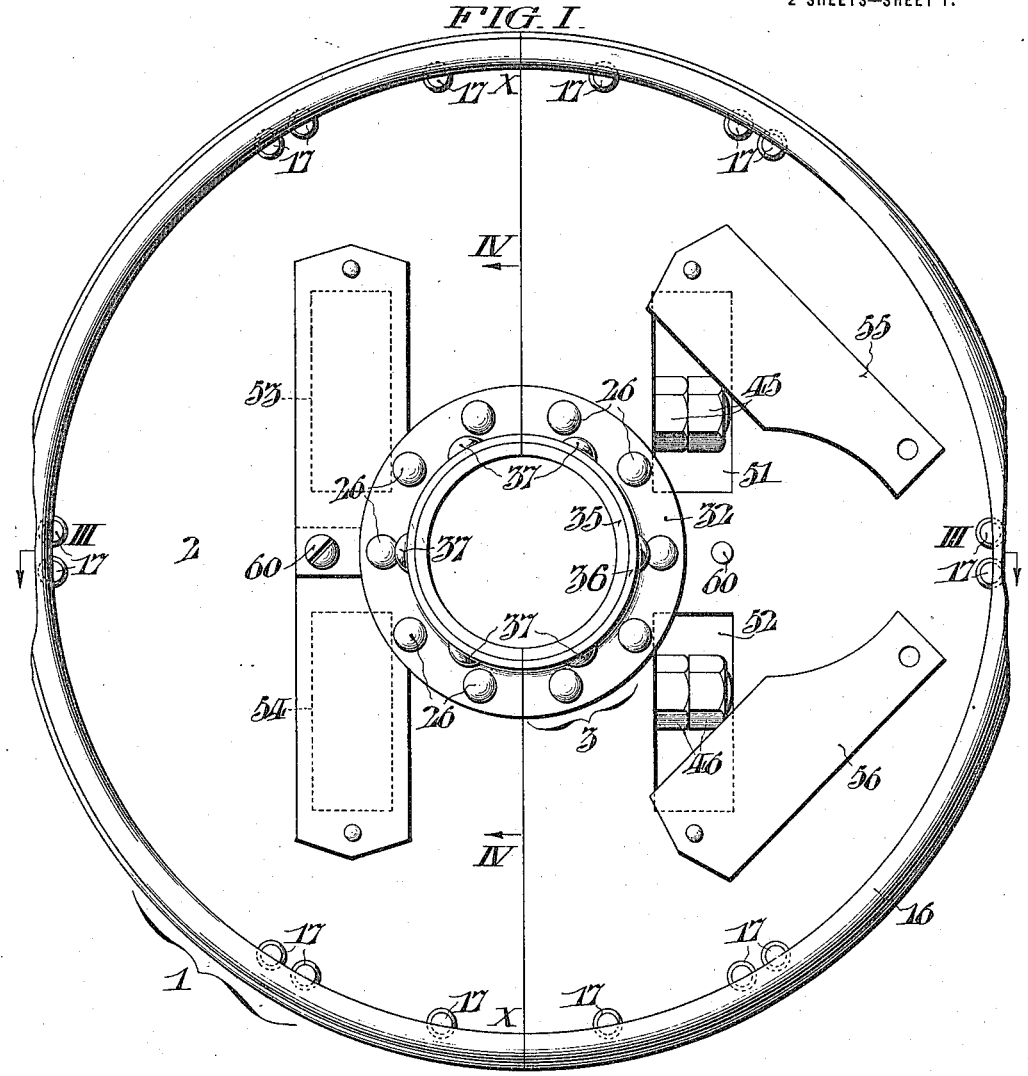
FIG. I.
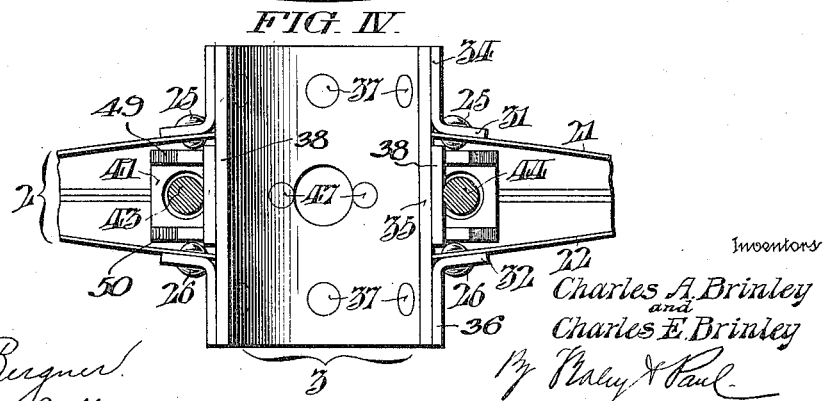
FIG. IV.
Witnesses
John C. Bergner
James H. Bell
Inventors
Charles A. Brinley
and
Charles E. Brinley
By Raley & Paul
Attorneys

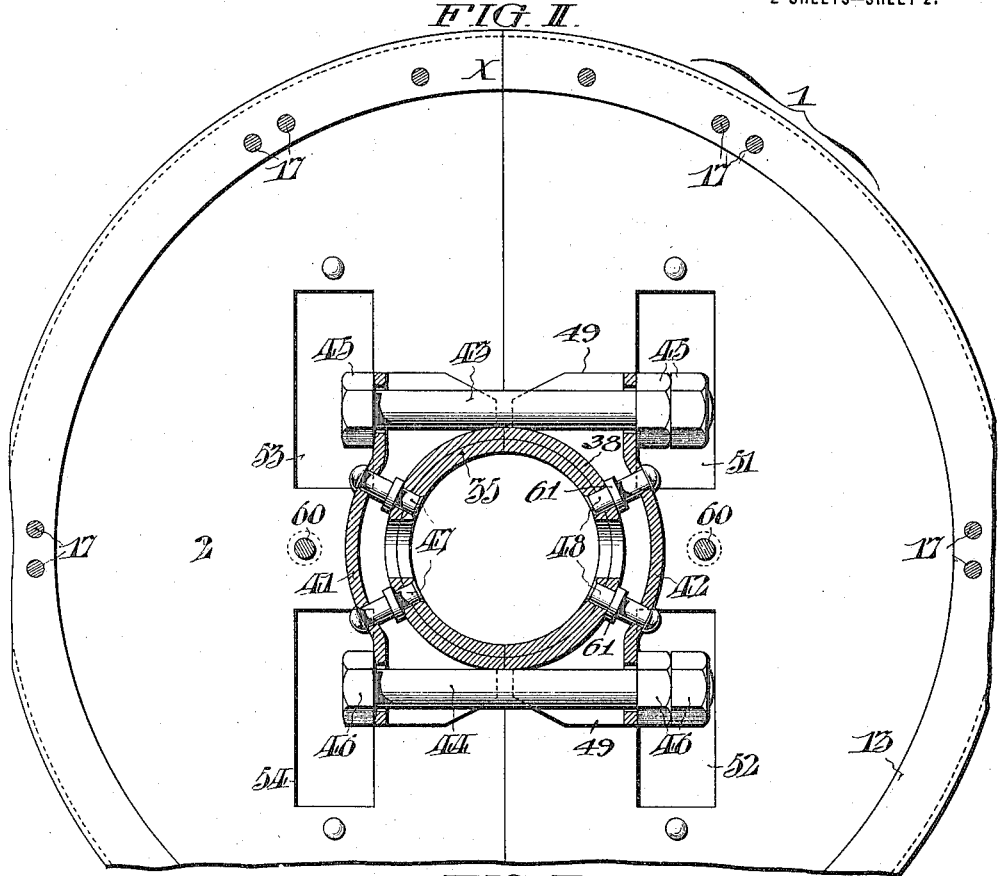
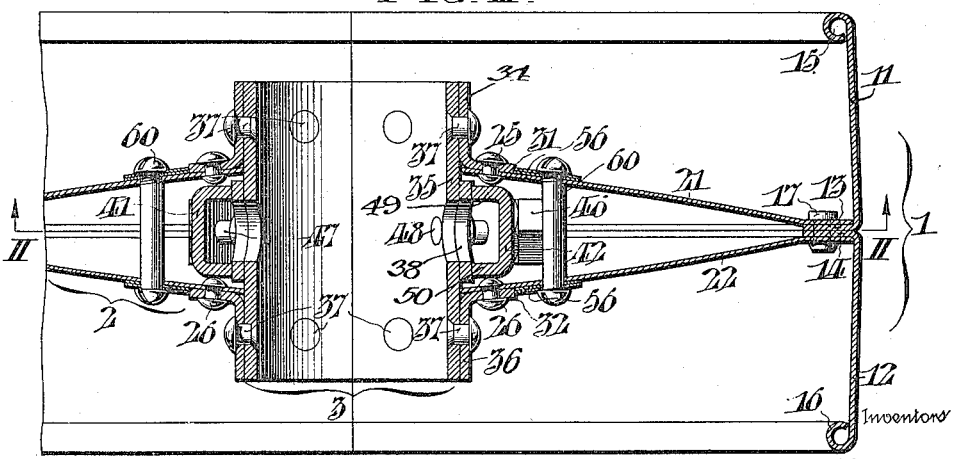

UNITED STATES PATENT OFFICE.

CHARLES A. BRINLEY AND CHARLES E. BRINLEY, OF PHILADELPHIA, PENNSYLVANIA, ASSIGNORS TO THE AMERICAN PULLEY COMPANY, OF PHILADELPHIA, PENNSYLVANIA, A CORPORATION OF PENNSYLVANIA.

PULLEY.

1,152,282.  Specification of Letters Patent.  Patented Aug. 31, 1915.

Application filed January 5, 1912. Serial No. 669,526.

*To all whom it may concern:*

Be it known that we, CHARLES A. BRINLEY and CHARLES E. BRINLEY, of Philadelphia, in the county of Philadelphia and State of Pennsylvania, have jointly invented certain new and useful Improvements in Pulleys, whereof the following is a specification, reference being had to the accompanying drawings.

Our invention relates to the so-called split pulleys, which are divided diametrically, into similar parts, (which we term "half-pulleys"), in order to facilitate their application to a shaft, and the object of our improvements is to provide a pulley of this class, in which the connection between the rim and the hub is formed of a double hollow web substantially continuous on each side, said web portions being connected to the hub in such manner as to afford a maximum degree of strength at that region, and being so constructed as to accessibly inclose the clamping devices necessary for attachment to the shaft. We thus obtain a pulley whose sides present substantially flush surfaces affording the least possible opportunity for lodgment of lint, dust, etc., and free from projecting parts, which are liable to strike or catch in adjacent objects, while at the same time we insure the proper conditions for the connection of the web to the hub, the attachment of the two half-pulleys to one another, and the application thereof to the shaft.

Referring to the drawings, Figure I, represents a side elevation of a pulley embodying our invention. Fig. II, is a vertical section, on the median plane, at right angles to the axis of the pulley. Fig. III, is a partial transverse section on a plane coincident with the axis of the pulley and indicated at III, III, in Fig. I. Fig. IV, is a partial view, in elevation, of the meeting face of one of the half-pulleys, showing adjacent portions of the web, the extent of view comprised and the direction thereof, being indicated at IV, IV, in Fig. I.

The plane of diametrical separation of the split pulley is indicated at X, X, in Fig. I, and as the two half-pulleys are similar in construction throughout, it will only be necessary to describe in detail one thereof.

Each half-pulley comprises three main members, consisting of a rim 1, a hub 3, and an intermediate hollow web connection 2, all of said members being composite structures.

The rim 1, comprises two similar semi-annular bands 11, and 12, having inwardly extending radial flanges 13, and 14, respectively, along their proximate edges, and preferably provided with beads 15, and 16, respectively, along their exterior edges.

The hollow web member 2, is formed of two semi-annular plates 21, and 22, of sheet metal, the portions adjacent to their outer peripheries lying in planes parallel to and embracing the flanges 13, and 14, of the rim. Rivets 17, arranged at suitable intervals, connect the two parts of the web and the flanges 13, and 14, of the rim together, at this region. As the plates 21, and 22, extend inwardly toward the center of the pulley, they are reversely dished so as to diverge from one another, as shown in Figs. III, and IV, and are secured to the hub member 2, by means of rivets 25, and 26, respectively, arranged at suitable intervals.

The hub member 3, comprises four parts, viz.—the semi-cylindrical hub-shell 35, and three half-ring portions. Two of these half-ring portions 34, and 36, (which we term the exterior half-rings), are provided with flanges 31, and 32, respectively, extending radially outward at an inclination corresponding to the inclination or pitch of the plates 21, and 22, at the region of attachment of the rivets 25, and 26, which pass through said flanges. The half-rings 34, and 36, are secured to the hub-shell, adjacent to the respective ends thereof, by means of rivets 37. Within the space inclosed by the double web, (or plates 21, and 22), and intermediate between the exterior half-rings 34, and 36, is a third half-ring 38, which is a flat band closely embracing the hub-shell 35. The intermediate half-rings 38, are attached to the hub-shells by means of rivets 47 and 48, having flanges 61, the stems of said rivets extending radially outward beyond the flanges 61, in order to retain in position certain members of the devices for attaching the two halves of the pulley to one another and to the shaft.

The attaching devices comprise two similar clamping-pieces 41, and 42, of arch-shaped cross section, each piece having inwardly extending parallel flanges, such as 49, and 50, connected by an intermediate portion, which constitutes the crown of the arch, said intermediate, or crown portion, being itself slightly curved, at the region near its longitudinal center, in general conformity with the contour of the hub-shell, as shown at 62, in Fig. II.

The flanges 49, and 50, are suitably apertured to embrace and fit closely upon the exterior surface of the intermediate half-ring 38, which thus affords an extended bearing for the clamping-piece. The clamping-piece 42, is retained in the proper relation to the hub-shell 35, by means of the prolonged stems of the rivets 48, which pass through the crown portion of the clamping-piece.

The two halves of the pulley are attached to one another and to the shaft by means of the bolts 43, and 44, which pass through apertures in the crown portions of the clamping-pieces, near the respective extremities thereof, and are provided with nuts 45, and 46, whereby the said clamping pieces may be drawn toward one another, forcing the two portions of the hub shell into close contact with the shaft and also maintaining the meeting edges of the half-pulleys in close relation to one another.

It will be noted that the clamping-pieces and bolts are entirely inclosed within the hollow web, and thus protected as above stated. In order to permit access to the nuts of the respective bolts, we provide openings 51, 52, 53, and 54, in the webs, at points adjacent to the positions of the respective nuts, the area of said openings being just sufficient to permit convenient manipulation of the nuts from the outside. At each of the openings we provide a pivoted or swinging door, such as those shown at 55, and 56, which, when in a closed position, as shown at the left hand side of Fig. I, completely cover the respective openings. Said doors are preferably held with sufficient friction to prevent accidental displacement, and are preferably made of such length that their ends overlap slightly when in a closed position, in order that two may be secured in common by means of a single screw 60, which passes through apertures in each of the doors and through the web. The access openings may be formed in either one or both sides of the hollow web as preferred.

Having thus described our invention, we claim:

1. In a split pulley, the combination of two half-pulleys; each comprising a semi-cylindrical hub shell; a pair of half-rings attached thereto, near the respective ends thereof, said half-rings having at their inner edges semi-annular flanges extending in a generally radial, but converging direction and with a substantial interspace between them; an intermediate half-ring secured to the hub-shell between said flanges; and a clamping piece of arch-shaped cross section arranged between said flanges and bearing upon said intermediate half-ring; together with screw bolts extending through said clamping pieces, and nuts for said bolts; each half pulley also comprising a pair of reversely dished inclined semi-annular webs, secured respectively at their inner edges to the flanges of said first mentioned half-rings, one of said webs being provided with limited openings arranged immediately opposite to the nuts upon said bolts, but both of said webs being otherwise continuous throughout; and a pair of semi-annular rim portions having at their meeting edges inwardly extending flanges secured between the peripheral edges of said webs, said intermediate half-rings, clamping-pieces, bolts and nuts being completely inclosed between the webs of the respective half-pulleys.

2. In a split-pulley, the combination of two half-pulleys; each comprising a semi-cylindrical hub shell; a pair of half-rings attached thereto, near the respective ends thereof, said half-rings having at their inner edges semi-annular flanges extending in a generally radial, but converging direction and with a substantial interspace between them; an intermediate half-ring secured to the hub-shell between said flanges; and a clamping piece of arch-shaped cross section arranged between said flanges and bearing upon said intermediate half-ring; together with screw bolts extending through said clamping pieces, and nuts for said bolts; each half-pulley also comprising a pair of reversely dished inclined semi-annular webs, secured respectively at their inner edges to the flanges of said first mentioned half-rings, one of said webs being provided with limited openings arranged immediately opposite to the nuts upon said bolts, but both of said webs being otherwise continuous throughout; swinging doors adapted to completely close said openings; means for retaining them in a closed position; and a pair of semi-annular rim portions having at their meeting edges inwardly extending flanges secured between the peripheral edges of said webs, said intermediate half-rings, clamping pieces, bolts and nuts being completely inclosed between the webs of the respective half-pulleys.

In testimony whereof, we have hereunto signed our names at Philadelphia, Pennsylvania, this third day of January 1912.

CHARLES A. BRINLEY.
CHARLES E. BRINLEY.

Witnesses:
JOHN W. MUIR,
JOSEPH ENTWISLE.